UNITED STATES PATENT OFFICE.

AUGUSTUS BISCHLER AND ANTON BASELLI, OF BASEL, SWITZERLAND, ASSIGNORS, BY MESNE ASSIGNMENTS, TO J. BASLER & CIE., OF BASEL, SWITZERLAND, A FIRM.

PROCESS FOR THE MANUFACTURE OF ISOBORNYL OXALATES FROM CAMPHENE.

No. 876,310. Specification of Letters Patent. Patented Jan. 7, 1908.

Original application filed September 13, 1906, Serial No. 334,370. Divided and this application filed April 17, 1907. Serial No. 368,612.

*To all whom it may concern:*

Be it known that we, AUGUSTUS BISCHLER, doctor of philosophy and chemist, a subject of the Emperor of Russia, and resident of Basel, Switzerland, and ANTON BASELLI, doctor of philosophy and chemist, a subject of the Emperor of Austria-Hungary, and resident of Basel, Switzerland, have invented a new and useful Process for the Manufacture of Isobornyl Oxalates from Camphene, of which the following is a full, clear, and exact specification.

N. Zelinsky and J. Zelikow (*Berl. Ber.* 34, pag. 3249) have shown that alcohols are transformed into unsaturated hydrocarbons when heated with oxalic acid, for instance by heating cyclohexanol at 100–110° C. with five times its weight of anhydrous oxalic acid, they obtained tetrahydrobenzene. In similar manner they have converted menthol into menthene and borneol into camphene. Since in these researches a large excess of anhydrous oxalic acid was used and as the reaction product, for instance that obtained by heating borneol, consisted of camphene, crystallized oxalic acid and a great excess of anhydrous oxalic acid, the deduction could be made that such unsaturated hydrocarbons could not be combined with oxalic acid. According to the present invention, however, camphene is caused to combine directly with oxalic acid to produce isobornyl oxalates.

The condensation of camphene with anhydrous oxalic acid may be effected with or without a solvent and with or without a condensing agent.

Example *a*). A solution of 100 parts of camphene and 100 parts of anhydrous oxalic acid in 300 parts of acetone are mixed with 5 parts of sulfuric acid and the mixture is allowed to remain at 15–25° C. for three days. After this time the formed isobornyl oxalates are separated from the reaction mass in the following manner: From the pale brownish liquid constituting the said reaction mass the acetone is distilled away after the sulfuric acid has been neutralized with sodium carbonate. There remains a feebly colored oil which contains free oxalic acid, acid isobornyl oxalate and neutral isobornyl oxalate, beside a little unchanged camphene. The oxalic acid is first separated by shaking with hot water; then the acid isobornyl oxalate is separated from the neutral oxalate by shaking with a solution of sodium carbonate and then neutralizing this solution with a mineral acid.

The neutral isobornyl oxalate is purified from the unchanged camphene remaining in it forming a small percentage by distillation in steam. From alcohol this oxalate crystallizes in colorless, odorless needles which melt at 113–114° C.

The acid isobornyl oxalate cannot be crystallized. After long standing crystals do indeed separate from the oil, but these consist of the neutral oxalate and oxalic acid.

Example *b*). 130 parts of camphene and 50 parts of anhydrous oxalic acid are dissolved in 200 parts of acetone; 5 parts of sulfuric acid or phosphoric acid of 50 per cent. strength are added and the mixture is boiled for 8 hours in a reflux apparatus. The product is then worked up as described in Example *a*).

Example *c*). 500 parts of camphene, 350 parts of anhydrous oxalic acid and 50 parts of a mixture of acid and neutral isobornyl oxalates, such as may be obtained according to the foregoing Examples *a*) and *b*), are heated together for 12 hours at 100°–105° C., while stirring well. The isobornyl oxalate aids the condensation in that it gradually dissolves the oxalic acid and the camphene. The further treatment of the product that is to say the separation of the formed isobornyl oxalates from the reaction mass is more simple than in the preceding examples, the oxalic acid being first directly extracted with hot water, then the acid oxalate separates in a solution of sodium carbonate and the camphene which has not entered into reaction is distilled away with steam. The neutral isobornyl oxalate remains.

Camphene may also be condensed with oxalic acid by directly heating the mixture without using a solvent. The condensation, however, does not occur quite so smoothly, for some formyl ester is formed at the same time.

The following Example *d*) states the precise details of the condensation of camphene with oxalic acid by directly heating the mixture.

Example *d*). 100 parts of camphene and 100 parts of anhydrous oxalic acid are heated together during 12 hours, while stirring, at 110 to 115° C. After the excess of oxalic acid has been removed, the acid isobornyl oxalate is separated from the neutral oxalate by a solution of sodium carbonate and the camphene which has not entered into reaction is distilled away with steam.

While Zelinsky and Zelikow obtained camphene by heating borneol with oxalic acid, we obtain isobornyl oxalates by heating camphene with anhydrous oxalic acid. This behavior of the oxalic acid to borneol and camphene may be explained as follows:

Camphene combines at first with the oxalic acid to form the acid isobornyl oxalate which, as we have found, decomposes smoothly into camphene and oxalic acid, by its distillation with steam. But as water is split off when borneol is heated with oxalic acid, this water will prevent the combination of camphene with oxalic acid.

The acid isobornyl oxalate is very easily saponified; with more than 2 molecular proportions of caustic alkali the reaction occurs even at the ordinary temperature; with more than 1 molecular proportion of lime or baryta heat is required. The neutral isobornyl oxalate is split up into isoborneol and a salt of the oxalic acid when strongly stirred with 2½ molecular proportions of hot caustic soda lye, as well as when boiled with more than 1 molecular proportion of baryta or milk of lime.

The yields of isoborneol obtained by the saponification of isobornyl oxalate are nearly quantitative. The regeneration of oxalic acid is also very easy and smooth.

What I claim is:

1. The described process for the manufacture of isobornyl oxalates consisting in reacting upon camphene with anhydrous oxalic acid and separating the isobornyl oxalates from the reaction mass, as described.

2. The described process for the manufacture of isobornyl oxalates consisting in reacting upon camphene with anhydrous oxalic acid in presence of a solvent and separating the isobornyl oxalates from the reaction mass, as described.

3. The described process for the manufacture of isobornyl oxalates consisting in reacting upon camphene with anhydrous oxalic acid in presence of a condensing agent and of a solvent and separating the isobornyl oxalates from the reaction mass, as described.

4. The described process for the manufacture of isobornyl oxalates consisting in heating camphene with anhydrous oxalic acid and separating the isobornyl oxalates from the reaction mass, as described.

5. The described process for the manufacture of isobornyl oxalates, consisting in heating camphene with anhydrous oxalic acid in presence of a solvent and separating the isobornyl oxalates from the reaction mass, as described.

6. The described process for the manufacture of isobornyl oxalates consisting in heating camphene with anhydrous oxalic acid in presence of a solvent and of a condensing agent, and separating the isobornyl oxalates from the reaction mass, as described.

In witness whereof we have hereunto signed our names this third day of April 1907, in the presence of two subscribing witnesses.

AUGUSTUS BISCHLER.
ANTON BASELLI.

Witnesses:
 GEORGE GIFFORD,
 AMAND RITTER.